(12) United States Patent
Mayor et al.

(10) Patent No.: US 8,862,060 B2
(45) Date of Patent: Oct. 14, 2014

(54) METHODS FOR MITIGATING EFFECTS OF RADIO-FREQUENCY INTERFERENCE

(75) Inventors: Robert W. Mayor, Half Moon Bay, CA (US); Joseph Hakim, Boulder Creek, CA (US)

(73) Assignee: Apple Inc., Cupertino, CA (US)

( * ) Notice: Subject to any disclaimer, the term of this patent is extended or adjusted under 35 U.S.C. 154(b) by 311 days.

(21) Appl. No.: 13/397,440

(22) Filed: Feb. 15, 2012

(65) Prior Publication Data

US 2013/0210364 A1 Aug. 15, 2013

(51) Int. Cl.
*H04B 1/00* (2006.01)
*H04B 15/00* (2006.01)

(52) U.S. Cl.
USPC ......... 455/63.1; 455/67.13; 455/78; 375/344; 375/346

(58) Field of Classification Search
CPC ....................................... H04B 15/02
USPC ......... 455/63.1, 67.13, 78, 226.2, 226.3, 296, 455/310, 501; 375/344, 346
See application file for complete search history.

(56) References Cited

U.S. PATENT DOCUMENTS

| | | | |
|---|---|---|---|
| 6,979,987 B2 | 12/2005 | Kernahan et al. | |
| 7,430,400 B2 | 9/2008 | Russo et al. | |
| 2008/0119140 A1* | 5/2008 | Maligeorgos et al. | 455/67.13 |
| 2011/0103432 A1 | 5/2011 | Tangudu et al. | |
| 2011/0157067 A1* | 6/2011 | Wagner et al. | 345/174 |

FOREIGN PATENT DOCUMENTS

EP 2204930 7/2010

* cited by examiner

*Primary Examiner* — Tuan H Nguyen
(74) *Attorney, Agent, or Firm* — Treyz Law Group; G. Victor Treyz; David C. Kellogg

(57) ABSTRACT

An electronic device may include sensitive circuitry such as radio-frequency receiver circuitry. A noise source may produce radio-frequency interference that can disrupt operation of the sensitive circuitry. The noise source may include a first transmitter such as a cellular telephone transmitter and as second transmitter such as a wireless local area network transmitter. Interference may be produced by simultaneous operation of the first and second transmitters. The radio-frequency receiver circuitry may be satellite navigation system receiver circuitry that includes one or more satellite navigation receivers. The impact of interference may be reduced by blanking the satellite navigation system receiver, by imposing a duty cycle limitation on the second transmitter, by switching between alternative receivers in the satellite navigation system receiver circuitry, by using an interference-dependent cross-correlation protection scheme, or by using a combination of these schemes.

19 Claims, 13 Drawing Sheets

METHODS FOR MITIGATING EFFECTS OF RADIO-FREQUENCY INTERFERENCE

BACKGROUND

This relates generally to electronic devices, and more particularly, to mitigating the effects of radio-frequency interference in electronic devices.

Electronic devices such as portable computers and cellular telephones are often provided with sensitive circuitry. For example, an electronic device may contain wireless receiver circuitry such as satellite navigation system receiver circuitry. If care is not taken, sources of interference such as wireless transmitters and other sources of radio-frequency signals may interfere with the proper operation of a receiver or other sensitive circuit. For example, the use of transmitter circuitry in an electronic device may prevent a satellite navigation system receiver from accurately detecting a user's location.

It would therefore be desirable to be able to provide improved ways in which to mitigate the effects of radio-frequency interference in an electronic device.

SUMMARY

An electronic device may include sensitive circuitry such as radio-frequency receiver circuitry. The radio-frequency receiver circuitry may be satellite navigation system receiver circuitry. The satellite navigation system receiver circuitry may include one or more satellite navigation system receivers such as a Global Positioning System (GPS) receiver and a Global Navigation Satellite System (GLONASS) receiver.

Components in the electronic device may serve as a noise source producing radio-frequency interference that can disrupt operation of the sensitive circuitry. The noise source may include a first transmitter such as a cellular telephone transmitter and as second transmitter such as a wireless local area network transmitter. Interference may be produced during simultaneous operation of the first and second transmitters.

The impact of interference that is produced by simultaneous operation of the first and second transmitters may be reduced by blanking the satellite navigation system receiver, by imposing a duty cycle limitation on the second transmitter, by switching between alternative receivers in the satellite navigation system receiver circuitry, by using an interference-dependent cross-correlation protection scheme, or by using a combination of these schemes. In configurations in which an electronic device uses multiple interference-mitigation schemes, the device may switch between different schemes depending on whether or not persistent interference is detected.

Further features of the invention, its nature and various advantages will be more apparent from the accompanying drawings and the following detailed description of the preferred embodiments.

DETAILED DESCRIPTION

Figure 1:
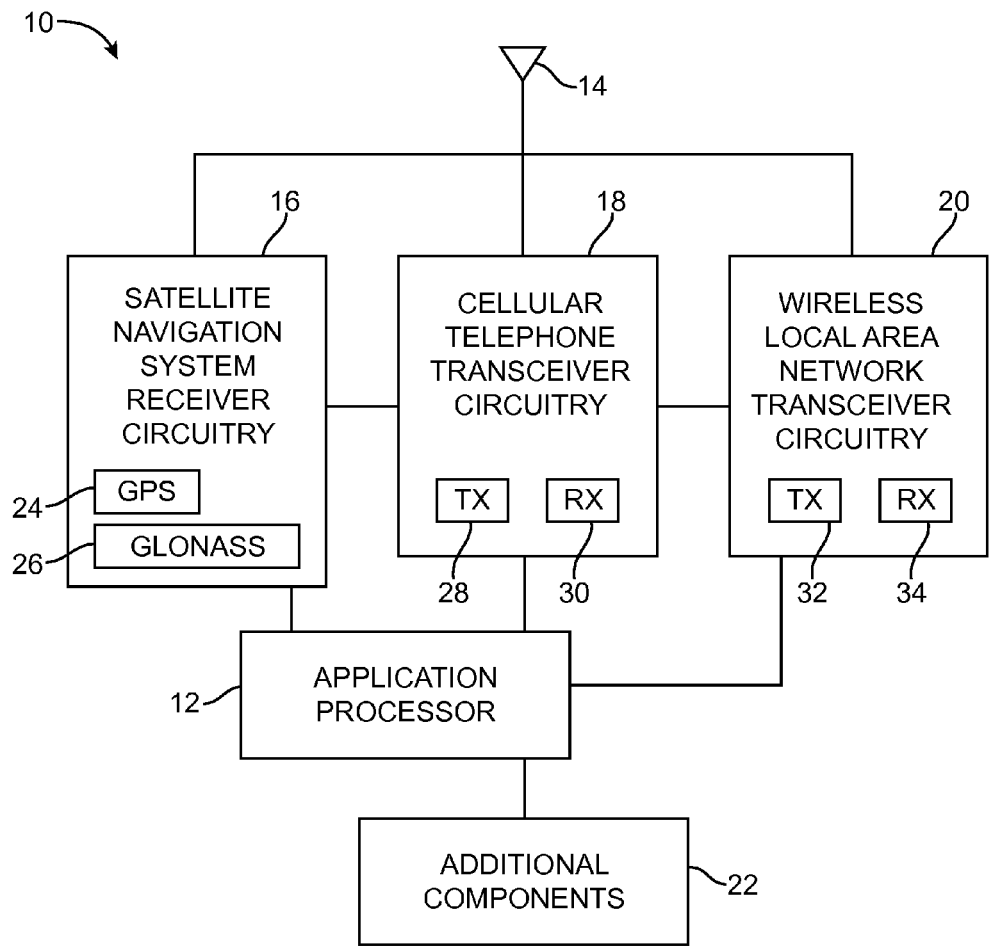
FIG. 1 is a diagram of illustrative components in an electronic device in accordance with an embodiment of the present invention.

Electronic devices such as electronic device 10 of FIG. 1 may be provided with sensitive circuitry. For example, device 10 may contain wireless receiver circuitry or other circuitry that is susceptible to radio-frequency interference. Radio-frequency interference may be generated by a noise source such as a radio-frequency transmitter, a clock, other circuits, or a combination of such circuits operating simultaneously. Interference may be associated with a fundamental frequency produced by a noise source, a harmonic frequency produced by a noise source, or sum or difference frequencies produced by noise-generating circuits (e.g., interference due to intermodulation).

In general, noise sources in electronic device 10 may be formed from any circuit that produces signals (clocks, component driver circuits, communications circuits, wireless circuits such as wireless transmitters, etc.). Radio-frequency interference from noisy circuitry in device 10 may adversely affect the operation of any circuitry that is sensitive to the presence of undesired radio-frequency signals. For example, radio-frequency interference may affect the operation of a sensor, a display, a communications circuit, a wireless receiver, or other sensitive circuit.

With one illustrative configuration, which is sometimes described herein as an example, electronic device 10 may contain sensitive circuitry such as receiver circuitry 16. Radio-frequency interference may be produced by internal components in device 10 such as transceiver circuitry 18, transceiver circuitry 20, and/or additional components 22 (e.g., clocks, component driver circuits, communications circuits, additional wireless transmitter circuitry, etc.). For clarity, an illustrative configuration in which interference for receiver circuitry 16 is produced during the simultaneous operation of transceiver circuitry 18 and transceiver 20 is sometimes described herein as an example. This is, however, merely illustrative. In general, electronic device 10 may have any suitable sensitive circuitry and may contain any type of noise-producing circuitry.

As shown in the illustrative configuration of FIG. 1, device 10 may have antenna structure such as antenna structures 14. Antenna structures 14 may include one or more antennas. Antenna structures 14 may be coupled to transceiver circuitry such as circuitry 16, 18, and 20. During signal reception operations, radio-frequency signals that have been received by antenna structures 14 may be processed by one or more receivers in receiver circuitry 16, by a receiver in transceiver 18 such as receiver 30, or by a receiver in transceiver 20 such as receiver 34. During signal transmission operations, antenna structures 14 may be used in transmitting radio-frequency signals that have been produced by a transmitter in transceiver 18 such as transmitter 28 and/or radio-frequency signals that have been produced by a transmitter in transceiver 20 such a transmitter 32.

Transceiver 18 may be, for example, a cellular telephone transceiver (e.g., a 2G, 3G, or 4G cellular transceiver or other suitable cellular telephone transceiver). Transceiver 20 may be, for example, a wireless local area network transceiver such as an IEEE 802.11 transceiver that operates in the 2.4 GHz and/or 5 GHz communications bands (as an example). Satellite navigation system receiver circuitry 16 may include one or more receivers for handling satellite navigation system signals from one or more satellite navigation systems. As an example, satellite system receiver circuitry 16 may include a first satellite navigation system receiver such as Global Positioning System (GPS) receiver 24 and a second satellite navigation system receiver such as Global Navigation Satellite System (GLONASS) receiver 26. Other satellite navigation system receivers may be included in satellite navigation system receiver circuitry 16 if desired.

With a configuration of the type shown in FIG. 1, the simultaneous operation of cellular telephone transmitter 28 and wireless local area network transmitter 32 may produce interference for GPS receiver 24 or GLONASS receiver 26. GPS receiver 24 may operate at a frequency of about 1575 MHz, whereas GLONASS receiver 26 may operate at a frequency of about 1602 MHz. Accordingly, GPS receiver 24 and GLONASS receiver 26 may be impaired under different operating conditions.

As one example, interference may be produced for receiver 24 when transmitter 28 is operating at a channel associated with a frequency of 837 MHz while transmitter 20 is operating at a channel associated with a frequency of 2412 MHz, because 2412 MHz−837 MHz (an intermodulation distortion signal that may be produced) is 1575 MHz (i.e., a frequency that falls in the receive band for receiver 24). As another example, interference may be produced for receiver 26 when transmitter 18 is operating at a channel associated with a frequency of 827 MHz while transmitter 20 is operating at a channel associated with a frequency of 2422 MHz, because 2422 MHz−827 MHz is 1595 MHz (which is close to the 1602 MHz operating frequency of receiver 26). Other combinations of channels for transmitters 28 and 32 may also produce interference for receiver 24 or receiver 26. The foregoing examples are merely illustrative.

To mitigate the effects of interference, control circuitry in device 10 can monitor for the presence of interference. When interference conditions are detected, the control circuitry can take appropriate mitigating actions. For example, the control circuitry may temporarily deactivate (i.e., blank) GPS receiver 24 and/or GLONASS receiver 26, may impose a duty cycle on an interference-producing transmitter such as transmitter 32, may implement a combination of transmitter duty cycle limitations and satellite navigation system receiver blanking functions, may dynamically adjust the performance of satellite navigation system receiver circuitry 16 (e.g., by adjusting the strategy used for implementing cross-correlation protection), and/or may use intelligent combinations of these schemes or other suitable interference mitigation schemes.

The control circuitry in device 10 may include processor integrated circuits such as microprocessors, digital signal processors, baseband processors, application-specific integrated circuits, microcontrollers, and other processing circuitry. The control circuitry in device 10 may also include storage such as volatile memory, non-volatile memory, hard-drive storage, solid state storage devices, removable media, and other storage devices. As shown in FIG. 1, for example, the control circuitry in device 10 may include at least one processor such as application processor 12 (e.g., a microprocessor that is used in implementing software applications and operating system functions for device 10).

Application processor 12 and other storage and processing circuitry in device 10 (e.g., baseband processors associated with transceiver circuitry 16, 18, and/or 20) may serve as control circuitry that is used in implementing control algorithms that control the operation of device 10. For example, the control circuitry of device 10 may be used in storing and running software that monitors and controls the operations of transceiver circuitry 16, 18, and 20. The control circuitry of device 10 may, for example, determine which combination of channels is being used by transmitters 28 and 32 and may adjust the operation of receivers 24 and 26 and the operation of transmitters 28 and 32 accordingly. Activity that may create radio-frequency interference (e.g., certain combinations of transmitted channels) may be monitored by monitoring input-output control signals associated with the operation of transceivers 18 and/or 20, may be monitored using radio-frequency signal sensors, or may be monitored by examining which control signals have been conveyed to transceivers 18 and 20 (as examples).

Figure 2:
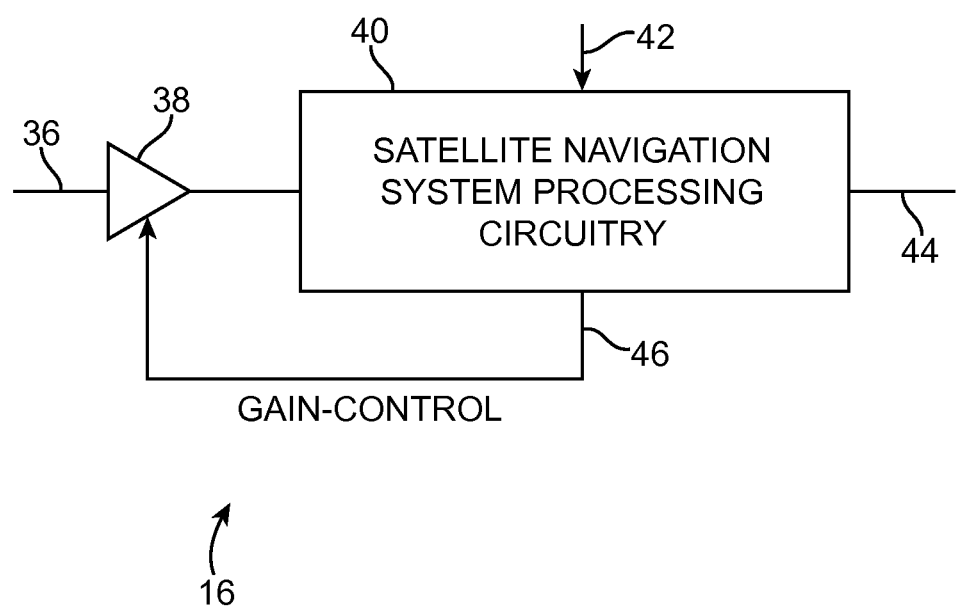
FIG. 2 is a diagram of an illustrative satellite navigation receiver in accordance with an embodiment of the present invention.

In some operating scenarios, it may be desirable to temporarily deactivate (blank) the operation of satellite navigation system receiver circuitry 16 (i.e., receiver 24 and/or receiver 26). An illustrative satellite navigation system receiver circuit is shown in FIG. 2. As shown in FIG. 2, receiver 16 may include an input such as input 36 that receives radio-frequency signals from antenna structures 14. These radio-frequency signals may include satellite signals from a constellation of satellites orbiting the earth. The satellite signals for a given satellite navigation system may include numerous orthogonal codes (sometimes referred to as coarse acquisition codes) that are broadcast on a common carrier (e.g., codes broadcast on the 1575 MHz carrier in a GPS system). Each satellite may have a respective code. By processing the signals, receiver 16 can determine the geographic location of receiver 16. Output 44 may be used to supply corresponding digital geographic location data to control circuitry in device 10.

Amplifier 38 may amplify the signals on input 36 for use by satellite navigation system processing circuitry 40. Processing circuitry 40 may receive control signals on control input 42 (e.g., control signals from application processor 12 and/or other control circuitry in device 10). These control signals may be used to activate or deactivate the receiver. Processing circuitry 46 can implement an automatic gain control function for amplifier 38 by producing a gain control signal GAIN_CONTROL on path 46. During operation of receiver 16, circuitry 46 can make adjustments to GAIN_CONTROL to adjust the gain that is exhibited by amplifier 38. With one suitable satellite navigation system receiver blanking technique, the receiver can be blanked (temporarily deactivated) in response to a blanking control signal supplied to input 42 by locking automatic gain control functions (i.e., by holding the gain of amplifier 38 constant using GAIN_CONTROL to avoid saturating amplifier 38) and by inserting logic "zeros" into processing circuitry 40 or otherwise ignoring the data produced by processing circuitry 40 at output 44. Other receiver blanking techniques may be used if desired.

Figure 3:
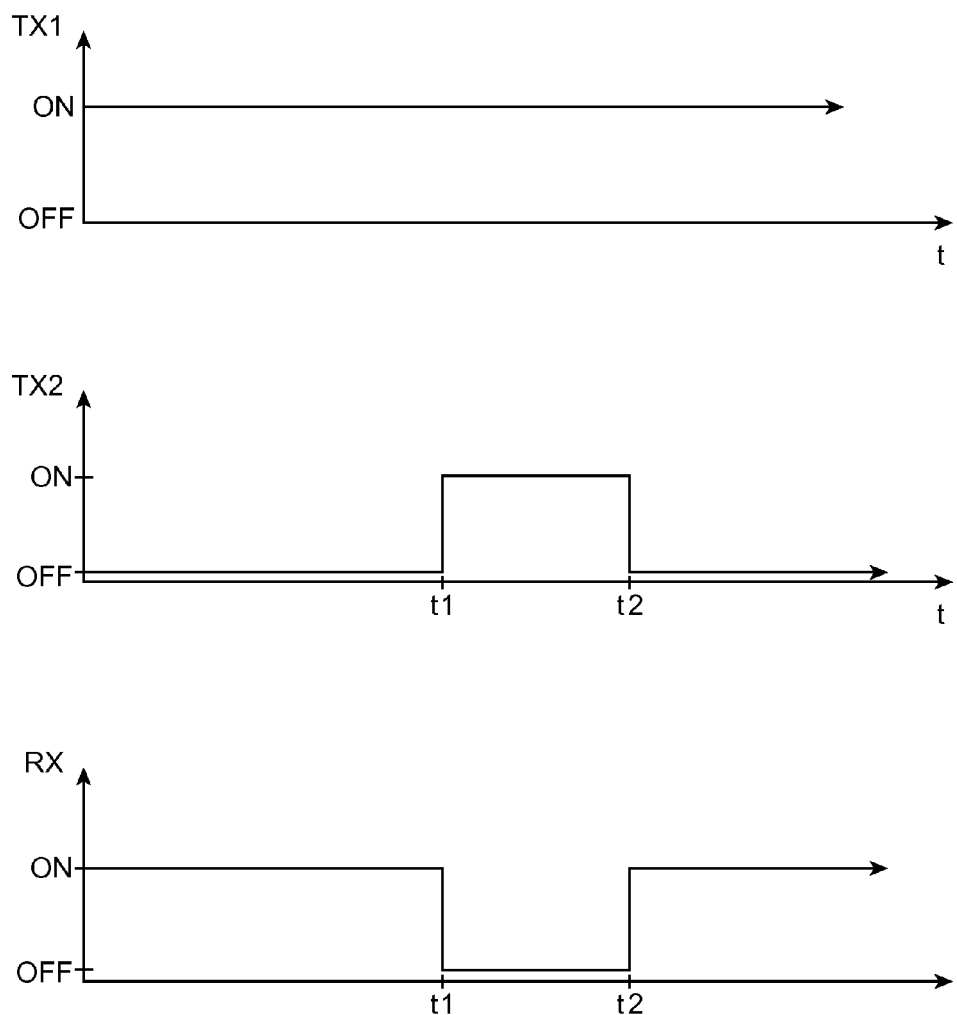
FIG. 3 is a set of timing diagrams showing how receiver circuitry can be temporarily disabled when interference from simultaneously operating transmitters is detected in accordance with an embodiment of the present invention.

FIG. 3 contains a set of timing diagrams that illustrate the use of receiver blanking techniques to mitigate the effects of radio-frequency interference in device 10. In the example of FIG. 3, device 10 is operating a sensitive circuit such as receiver RX. Receiver RX of FIG. 3 may be, for example, satellite navigation system receiver circuitry 16 (e.g., a GPS or GLONASS receiver). Device 10 is also operating transmitters TX1 and TX2.

In the example of FIG. 3 (and the following examples), transmitter TX1 may be a cellular telephone transmitter such as transmitter 28 of FIG. 1 (e.g., a 3G transmitter or other transmitter that is impossible or impractical to blank without disrupting cellular traffic) and transmitter TX2 may be a wireless local area network transmitter (e.g., a WiFi® transmitter operating in accordance with the IEEE 802.11 protocols).

Transmitters TX1 and TX2 and receiver RX may either be active or inactive, as indicated by the "ON" and "OFF" labels in the traces of FIG. 3. When receiver RX is on, receiver RX is vulnerable to interference. As described previously, certain combinations of transmitted frequencies from transmitters TX1 and TX2 have the potential to generate interference for receiver RX. To avoid the creation of erroneous data, receiver RX may be temporarily deactivated (i.e., receiver RX may be blanked) whenever the control circuitry in device 10 detects that a potential interference-creating combination of channels is being transmitted by transmitters TX1 and TX2.

In the example of FIG. 3, transmitter TX1 is always on. Transmitter TX2 is activated during the time period between time t1 and time t2. By monitoring transmitters TX1 and TX2, control circuitry in device 10 may determine that a potential interference-creating combination of channels is being transmitted between time t1 and time t2. In response to detecting this interference, the control circuitry may temporarily deactivate (blank) receiver RX between time t1 and time t2. This prevents receiver RX from producing erroneous output resulting from erroneous input during the time period between time t1 and time t2 due to the presence of interference.

Figure 4:
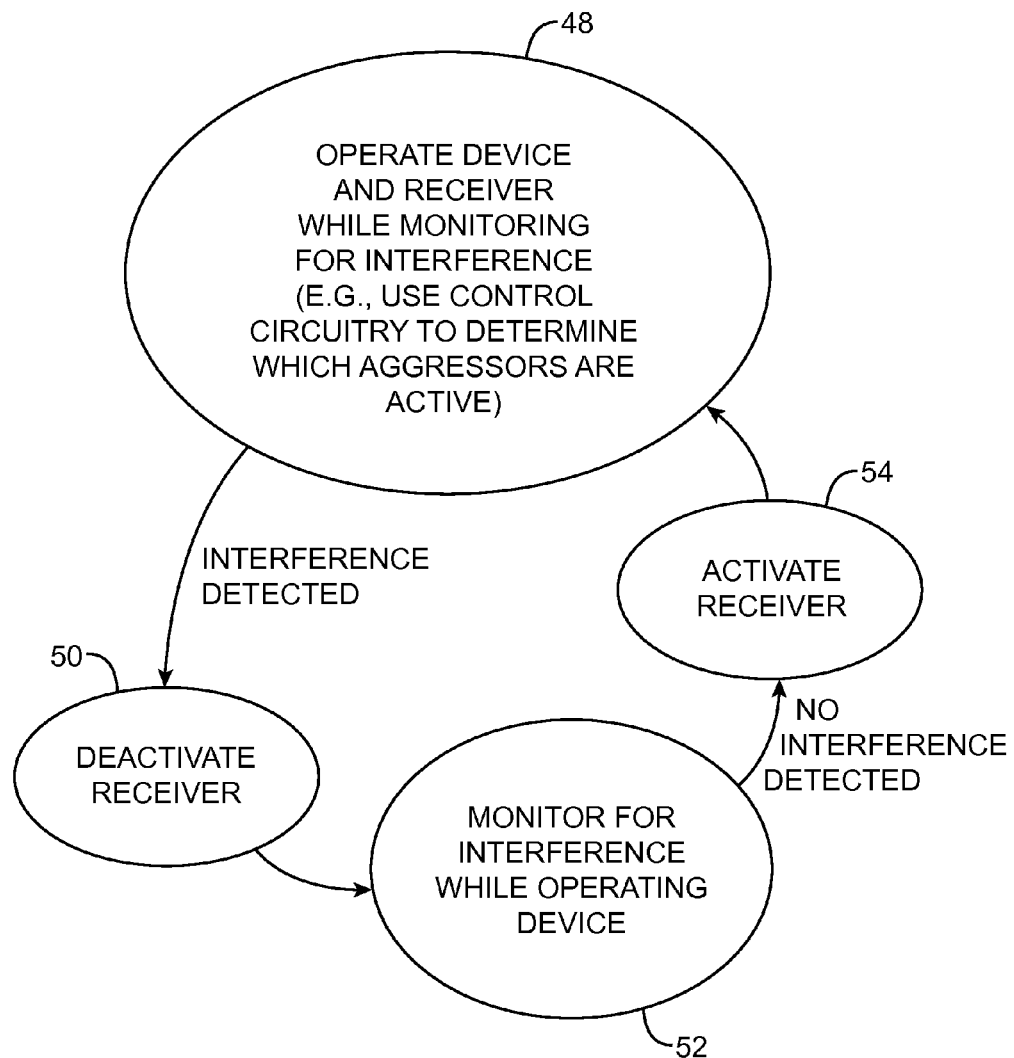
FIG. 4 is a diagram of illustrative operations involved in operating an electronic device while monitoring for radio-frequency interference and temporarily deactivating receiver circuitry when interference is detected in accordance with an embodiment of the present invention.

Illustrative operations involved in performing the satellite navigation blanking functions of FIG. 3 during the operation of device 10 are shown in FIG. 4.

At step 48, device 10 may use receiver RX to receive and process satellite navigation system signals. Control circuitry in device 10 may monitor the states of transmitters TX1 and TX2 to determine whether a potentially interference-producing combination of wireless channels is being used. When interference is detected by the control circuitry, satellite navigation system receiver circuitry RX may be deactivated (step 50). While receiver RX is deactivated, the control circuitry may monitor for the presence of interference (step 52). So long as interference for receiver RX is detected, receiver RX may remain deactivated. When interference is no longer detected (e.g., because transmitter TX2 is turned OFF at time t2 of FIG. 3), receiver RX can be activated by the control circuitry (step 54) and normal receiver operations can continue at step 48.

Figure 5:
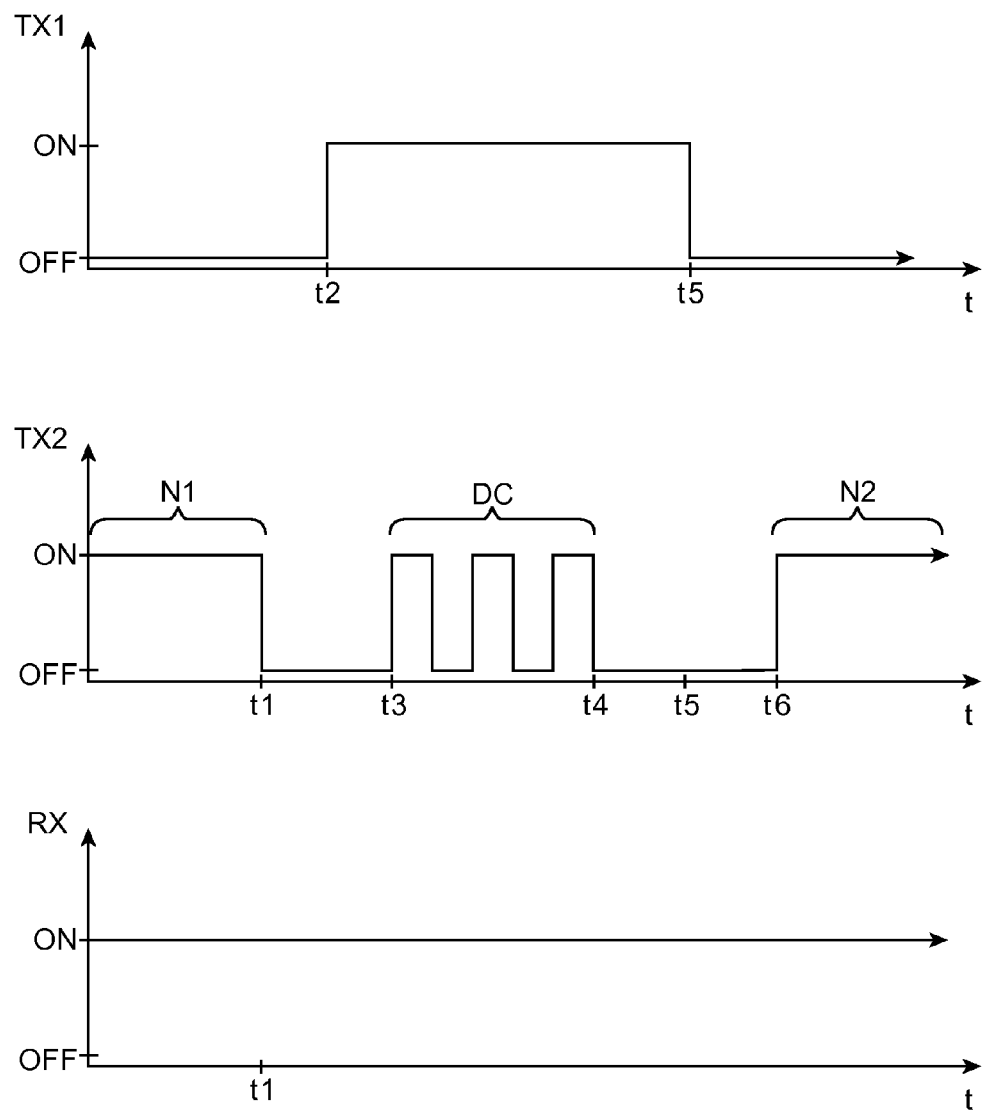
FIG. 5 is a set of timing diagrams showing how transmitter circuitry can be temporarily operated using a duty cycle when interference from simultaneously operating transmitters is detected in accordance with an embodiment of the present invention.

Another way in which the effects of interference can be mitigated is illustrated in the example of FIG. 5. In the FIG. 5 example, transmitter TX1 is off at times before time t2. Accordingly, transmitter TX2 may be allowed to operate normally during time period N1, without any need to blank receiver RX. At time t2, transmitter TX1 is activated. At time t3, device 10 wishes to activate transmitter TX2. The combination of channels associated with transmitters TX1 and TX2 (in this example) will create interference for receiver RX. To prevent this interference from overwhelming receiver RX, a duty cycle limitation may be imposed on transmitter TX. For example, transmitter TX may only be allowed to operate with a 50% duty cycle (e.g., 10 ms ON and 10 ms OFF) during duty cycle period DC. Other duty cycles (e.g., duty cycles larger than 50% or smaller than 50%) may also be used if desired. Once transmitter TX1 is no longer active (times after time t5), no interference will be present when transmitter TX2 operates, so transmitter TX2 may operate normally (without a duty cycle limitation) during time period N2 (times after time t6).

Receiver RX may use correlators to identify the satellite navigation system codes (e.g., GPS coarse acquisition codes) that are received. Each correlator may perform an integration of the type shown in equation 1 to produce satellite signal data $C_k$ for each visible satellite.

$$C_k = \int e^{\hat{}}(2\pi^* j^* f^* t) P(t-\tau)_k S(t) dt \quad (1)$$

In equation 1, index k is a satellite identifier (i.e., k=1 for the $1^{st}$ satellite with $\tau$ being the spreading code offset at the receiver), $e^{\hat{}}(2\pi^* j^* f^* t)$ is a complex multiplier with f being the intermediate mixing frequency to strip of carrier signal and Dopplers, 2 for the second satellite, etc.), $P_k$ corresponds to the satellite code (e.g., the GPS coarse acquisition code that is being transmitted by the $k^{th}$ satellite), and S corresponds to the radio-frequency signal input at input 36 of satellite receiver circuitry 16 (i.e., the radio-frequency signal received by antenna structures 14). The integration interval (sometimes referred to as the detection interval or correlation interval) is generally different for different correlators in device 10. As an example, strong signal correlators (correlators for acquiring strong satellite signals) may have an integration interval of 1-30 ms, medium signal correlators may have an integration interval of 80-100 ms, and weak signal correlators may use an integration interval of 1 s (as examples).

The duty cycle and the ON and OFF time periods of transmitter TX2 during duty cycle period DC may be chosen so as to ensure that operation of the satellite navigation system receiver is not disrupted. For example, the OFF (unjammed) time periods during duty cycle period DC may be chosen to have a length that is greater than or equal to one half of the strong signal integration interval. If this integration interval is 20 ms, as an example, the OFF period for transmitter TX2 during duty cycle period DC may be 10 ms or more.

Figure 6:
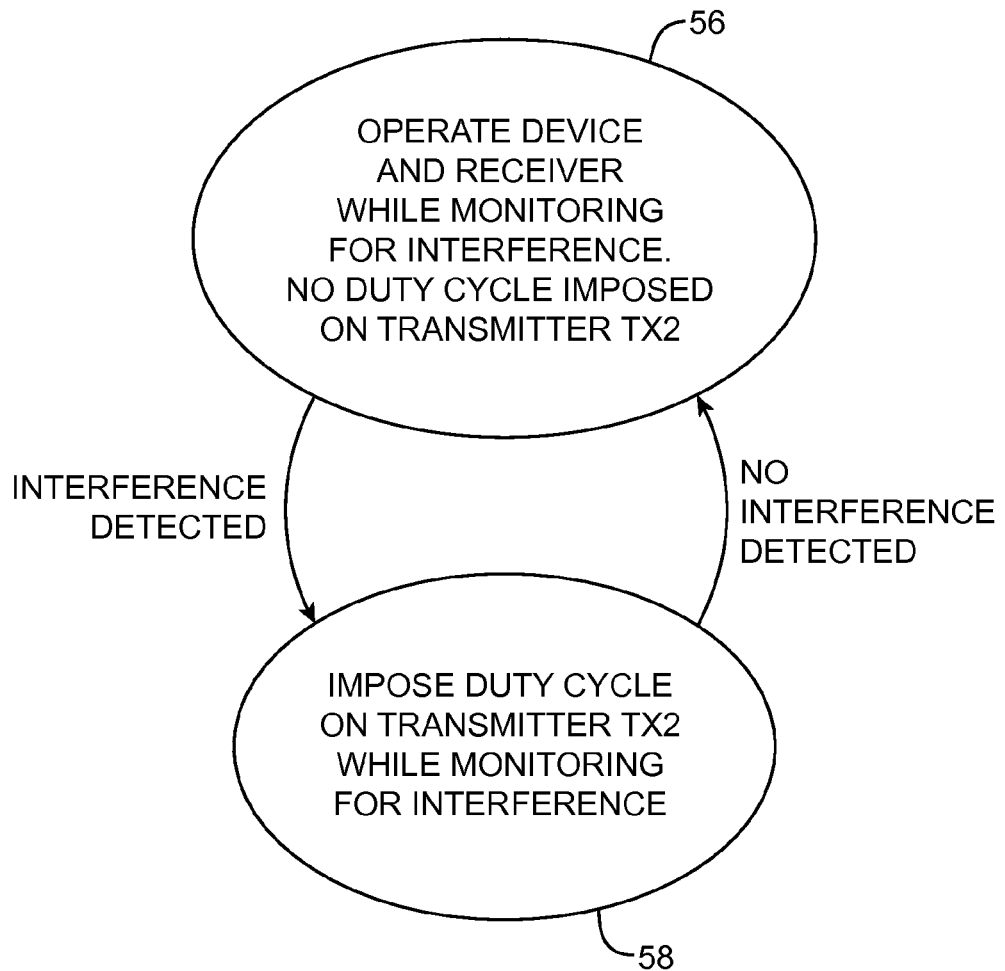
FIG. 6 is a diagram of illustrative operations involved in operating an electronic device while monitoring for radio-frequency interference and temporarily imposing a duty cycle on a transmitter when interference is detected in accordance with an embodiment of the present invention.

Illustrative operations involved in performing the transmitter duty cycle operations of FIG. 5 during the operation of device 10 are shown in FIG. 6.

At step 56, device 10 may use receiver RX to receive and process satellite navigation system signals. Control circuitry in device 10 may monitor the states of transmitters TX1 and TX2 to determine whether a potentially interference-producing combination of wireless channels is being used. When interference is detected by the control circuitry, satellite navigation system receiver circuitry RX may continue to operate receiver RX (as shown in the lowermost trace of FIG. 5), while imposing a duty cycle on transmitter TX2, as shown in period DC in the middle trace of FIG. 5 (step 58).

During the operations of step 58 (i.e., during duty cycle period DC), the control circuitry in device 10 may continue to monitor for the presence of interference. So long as interference for receiver RX is detected, transmitter TX2 may only be allowed to transmit using a series of ON and OFF periods (i.e., using a duty cycle). When interference is no longer detected (e.g., because transmitter TX1 is turned OFF at time t5 of FIG. 5), transmitter TX2 may be allowed to transmit normally (i.e., continuously, without a duty cycle).

In the example of FIGS. 5 and 6, the level of interference produced due to the simultaneous operation of transmitter TX1 and transmitter TX2 during duty cycle period DC is not severe enough to prevent satisfactory operation of receiver RX. Accordingly, receiver RX may be operated continuously during duty cycle period DC, without blanking, as shown in the lowermost trace of FIG. 5.

In some situations, however, the interference that is produced during duty cycle period DC may be severe. In these situations, control circuitry in device 10 may impose blanking on receiver RX in addition to imposing the duty cycle on transmitter TX2. This type of approach is illustrated in FIG. 7.

Figure 7:
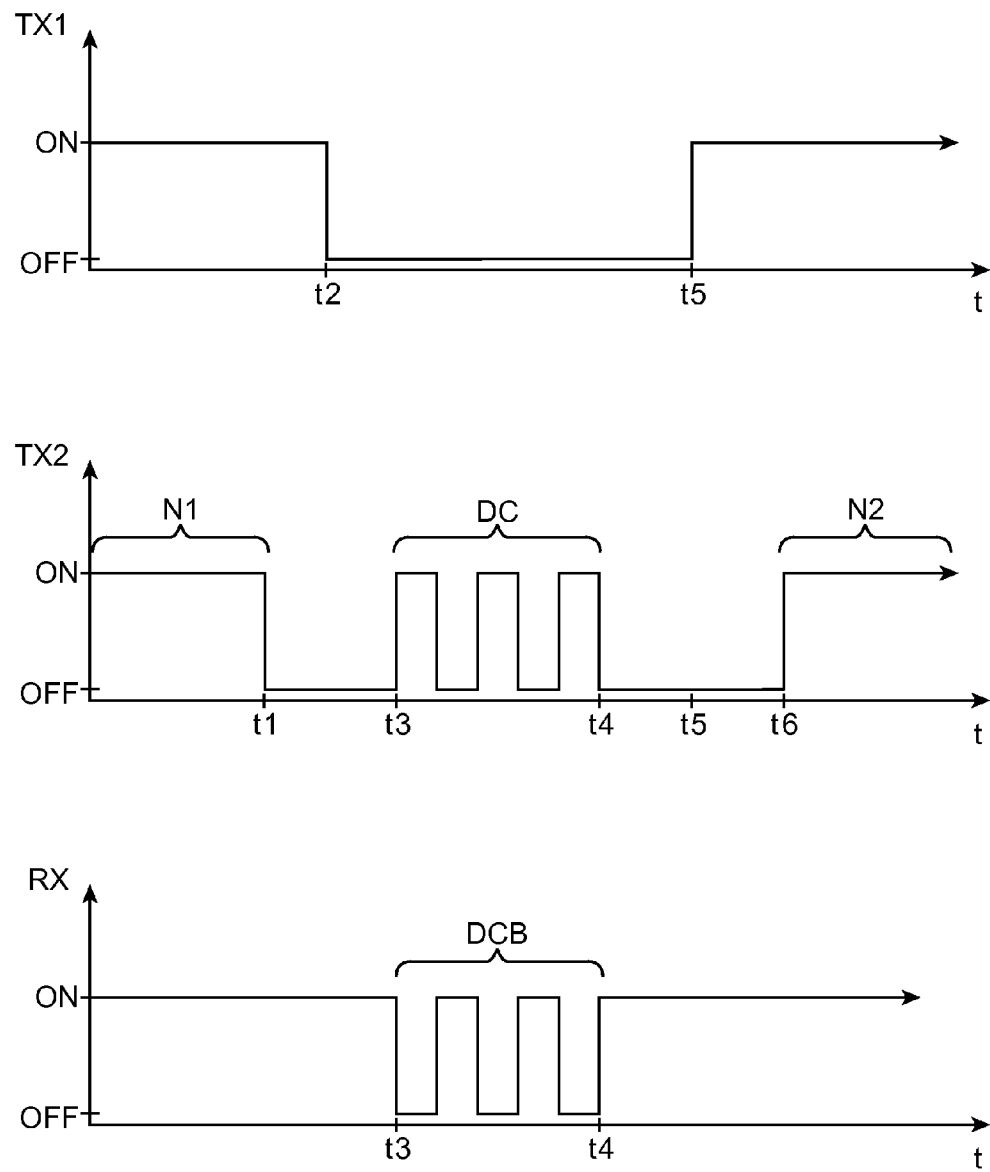
FIG. 7 is a set of timing diagrams showing how transmitter circuitry can be temporarily operated using a duty cycle and how receiver circuitry can be temporarily deactivated when interference from simultaneously operating transmitters is detected in accordance with an embodiment of the present invention.

In the FIG. 7 example, transmitter TX1 is off at times before time t2. Accordingly, transmitter TX2 may be allowed to operate normally during time period N1, without need to impose a duty cycle on transmitter TX2 or a need to blank receiver RX. At time t2, transmitter TX1 is activated. At time t3, device 10 wishes to activate transmitter TX2. The combination of channels associated with transmitters TX1 and TX2 (in this example) will create interference for receiver RX. To prevent this interference from overwhelming receiver RX, a duty cycle limitation may be imposed on transmitter TX (during duty cycle period DC) and receiver RX may be selectively blanked (during period DCB). During duty cycle period DC, transmitter TX2 may be turned on and off. Each time transmitter TX2 is turned on during period DC, receiver RX is temporarily turned off. Each time transmitter TX2 is turned off during duty cycle period DC, receiver RX is turned ON. Once transmitter TX1 is no longer active (times after time t5), no interference will be present when transmitter TX2 operates, so transmitter TX2 may operate normally (without a duty cycle limitation) during time period N2 (i.e., at times after time t6).

Figure 8:
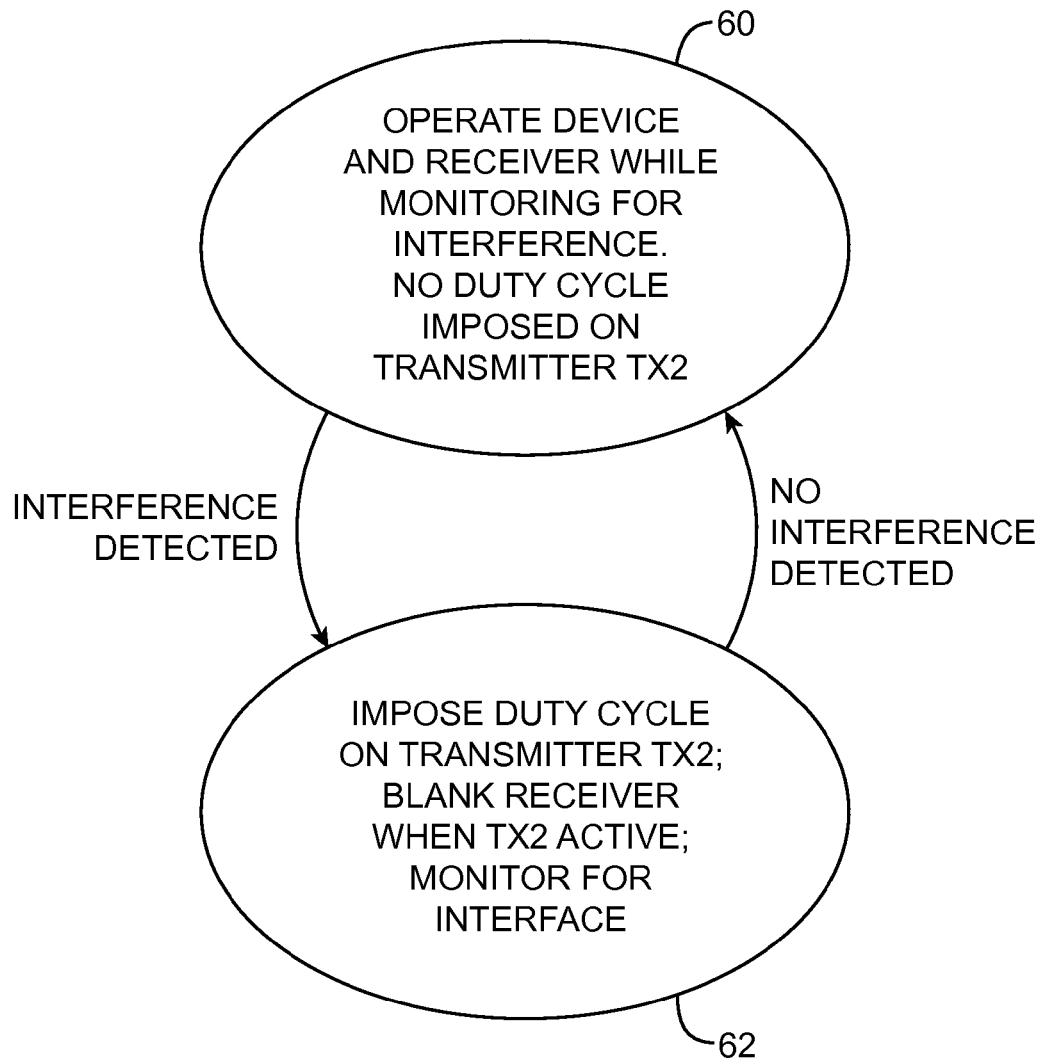
FIG. 8 is a diagram of illustrative operations involved in operating an electronic device while monitoring for radio-frequency interference and in temporarily imposing a duty cycle on a transmitter and temporarily deactivating receiver when interference is detected in accordance with an embodiment of the present invention.

Illustrative operations involved in performing the transmitter duty cycle and synchronous receiver blanking operations of FIG. 7 during the operation of device 10 are shown in FIG. 8.

At step 60, device 10 may use receiver RX to receive and process satellite navigation system signals. Control circuitry in device 10 may monitor the states of transmitters TX1 and TX2 to determine whether a potentially interference-producing combination of wireless channels is being used. When interference is detected by the control circuitry, a duty cycle limitation may be imposed on transmitter TX2 to ensure that transmitter TX2 will only operate using a duty cycle (ON/OFF periods). Receiver RX may be selectively blanked in synchronization with transmitter TX2. As shown in period DCB of FIG. 7, for example, receiver RX may be deactivated whenever transmitter TX2 is transmitting and may be activated whenever transmitter TX2 is inactive and not transmitting. So long as interference for receiver RX is detected, transmitter TX2 may only be allowed to transmit using a series of ON and OFF periods (i.e., using a duty cycle) and receiver RX may be blanked whenever TX2 is transmitting. When interference is no longer detected (e.g., because transmitter TX1 is turned OFF at time t5 of FIG. 7), transmitter TX2 may be allowed to transmit normally (i.e., without a duty cycle) and receiver RX may be allowed to receive normally (i.e., without blanking).

Some combinations of operating frequencies for transmitters TX1 and TX2 may create interference for GPS receiver 24 but not GLONASS receiver 26, whereas other combinations of operating frequencies for transmitters TX1 and TX2 may create interference for GLONASS receiver 26 but not GPS receiver 24. Either GPS receiver 26 or GLONASS receiver 26 may be used to supply location data for applications running on device 10. During operation of device 10, device 10 can therefore switch dynamically between GPS receiver 24 and GLONASS receiver 26 to avoid interference.

Figure 9:
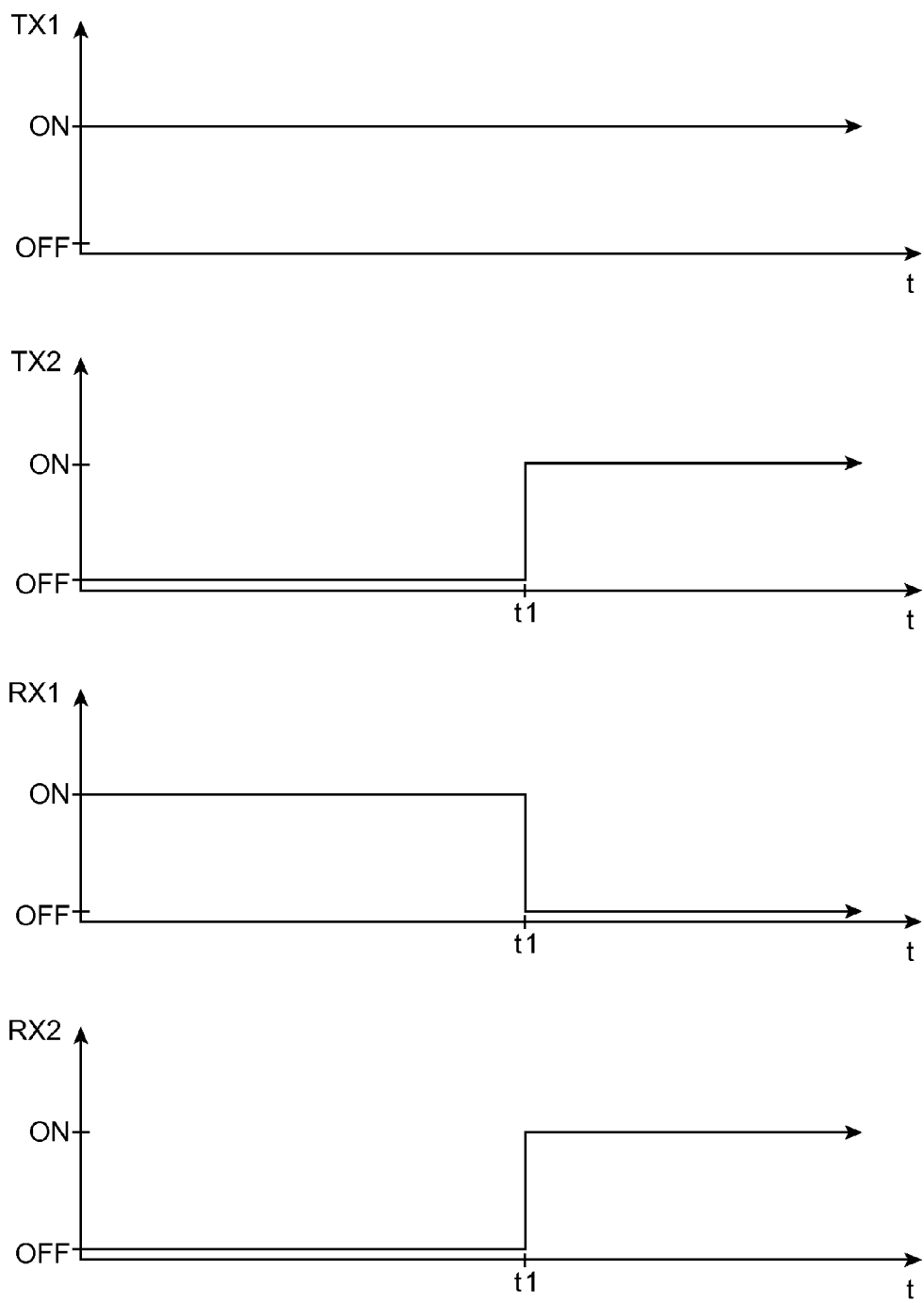
FIG. 9 is a set of timing diagrams showing how an electronic device can switch between different receiver circuits in response to detection of interference in accordance with an embodiment of the present invention.

This type of approach is illustrated in the graphs of FIG. 9. As shown in the example of FIG. 9, a first transmitter such as transmitter TX1 may be on. At time t1, a second transmitter TX2 may be switched from an off state to an on state. Receiver RX1 may be GPS receiver 24 and receiver RX2 may be GLONASS receiver 26 (or vice versa). When transmitter TX2 is turned on, interference is created for receiver RX1, but not receiver RX2 (in this example). Accordingly, device 10 can deactivate impaired receiver RX1 while activating unimpaired receiver RX2. By switching receiver RX2 into use in place of receiver RX1, the effects of interference from the simultaneous operation of transmitters TX1 and TX2 may be avoided. If transmitters TX1 and TX2 begin transmitting signals on channels that create interference for receiver RX2 while receiver RX2 is being used to produce location data for device 10, receiver RX1 can likewise be switched into use in place of receiver RX2.

Figure 10:
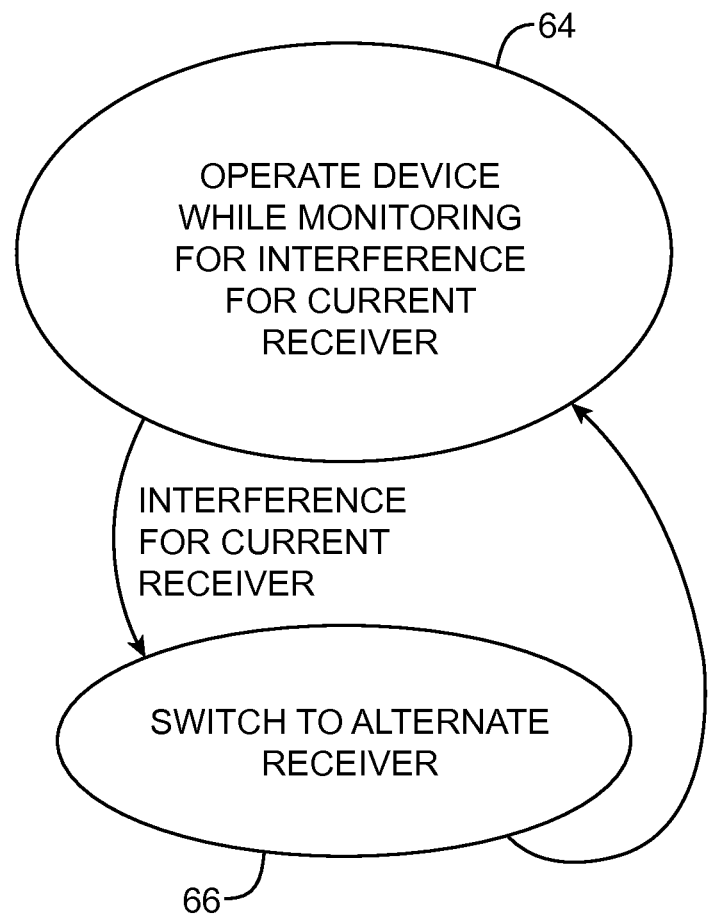
FIG. 10 is a diagram of illustrative operations involved in switch between different receiver circuits in an electronic device in response to detection of interference in accordance with an embodiment of the present invention.

Illustrative steps involved in operating a device with multiple satellite navigation system receivers (or other sensitive circuits) is shown in FIG. 10. At step 64, device 10 may be operated using a selected satellite navigation system receiver. Control circuitry in device 10 can monitor for interference. When interference for the currently selected satellite navigation system receiver is detected, control circuitry 10 can deactivate the currently selected satellite navigation system receiver and can activate an alternate satellite navigation system receiver (step 66). By switching the alternative satellite navigation system receiver into use in place of the current satellite navigation system receiver, interference due to the combination of channels being transmitted by transmitters TX1 and TX2 may be avoided. Following the operations of step 66, operations may return to step 64, where device 10 may monitor for interference that affects the newly activated satellite navigation system receiver. If the frequencies transmitted by transmitters TX1 and TX2 change to a combination that produces interference for the newly activated satellite navigation system receiver, device 10 can switch the original satellite navigation system receiver back into use (during swapping step 66). Processing can continue in this way, so that whenever interference is created for the current satellite navigation system receiver, device 10 switches the alternate receiver into use.

Figure 11:
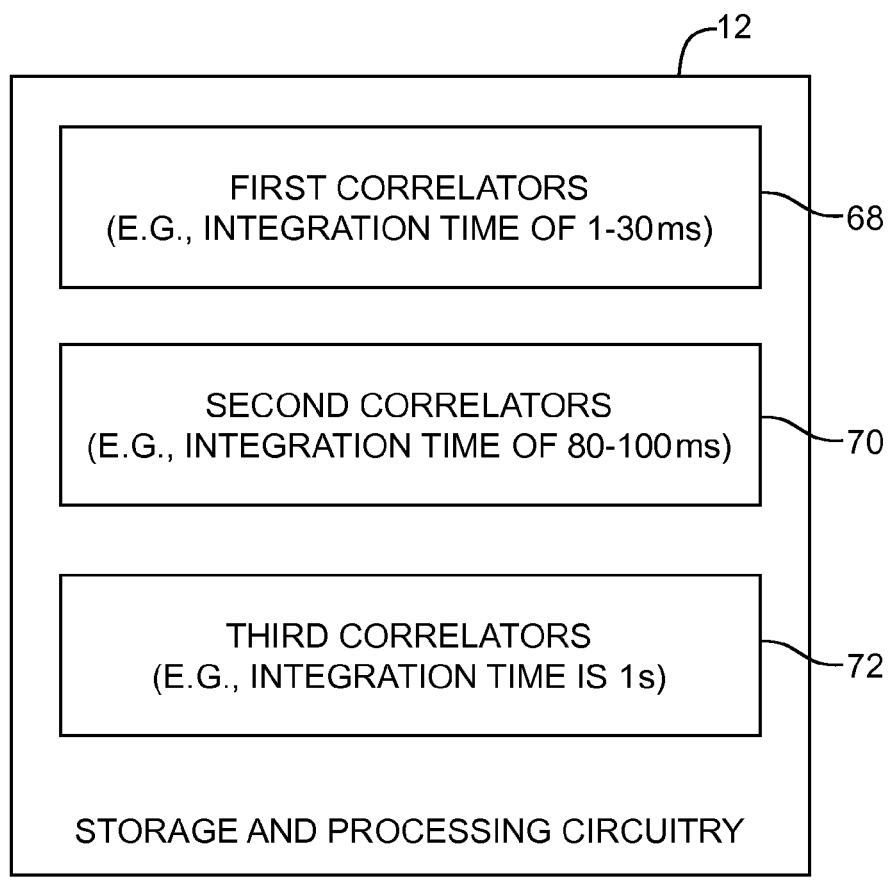
FIG. 11 is a diagram showing how control circuitry in an electronic device may be used to implement correlators with different integration times in accordance with an embodiment of the present invention.

As shown in FIG. 11, storage and processing circuitry 12 or other control circuitry in device 10 may be used to implement multiple satellite navigation system correlators such as correlators 68, correlators 70, and correlators 72. Correlators 68, 70, and 72 may be used to perform the decoding operations of equation 1 using different integration intervals. As an example, correlators 68 may have an integration interval of 1-30 ms (e.g., for sensing strong signals), correlators 70 may have an integration interval of 80-100 ms (e.g., for sensing medium signals), and correlators may use an integration interval of 1 s (e.g., for sending weak signals). Other integration intervals may be used by the correlators in device 10 if desired. These are merely illustrative integration integral examples.

Satellite navigation system codes (e.g., GPS coarse acquisition codes) are not completely orthogonal. Cross-correlation effects may therefore potentially generate false satellite acquisitions in the presence of strong signals. For example, if a first satellite is producing a strong signal S1, the correlators of device 10 can erroneously compute a (weak) non-zero value of $C_2$ for a second satellite. The erroneous C2 value, which is sometimes referred to as a cross-correlation (XCORR) is not a result of using equation 1 to properly detect the presence of a signal S2 with code $P_2$ from satellite 2, but rather is a false reading that results from the large size of the strong signal S1 from satellite 1 in combination with the non-orthogonality of code $P_1$ of satellite 1 and code $P_2$ of satellite 2.

The process of avoiding this type of false satellite navigation system data is sometimes referred to as cross-correlation protection. To provide cross-correlation protection, device 10 may perform additional operations to validate weak signal detections. These additional operations may be performed, for example, by using a correlator with an extended integration time. Using an extended integration time allows the correlator to discriminate between valid signals and invalid cross-correlation events. If a weak signal passes closer inspection during validation operations, device 10 can use the weak signal as valid satellite navigation system data (e.g., as a data point for computing the location of the satellite navigation system receiver). If, however, a weak signal does not pass closer inspection during validation operations, device 10 can conclude that the weak signal is due to an undesired cross-correlation and can ignore the weak signal.

Satisfactory cross-correlation protection can be adversely affected by the presence of interference (e.g., interference due to the simultaneous transmission of radio-frequency signals from transmitters TX1 and TX2 that fall within the receive band of a satellite navigation system receiver). In the presence of interference, cross-correlation protection operations may be compromised, because the sensitivity of device 10 in detecting satellite signals is degraded.

Consider as an example, a situation in which the received signal C1 (i.e., carrier-to-noise density power ratio $C/N_0$ for satellite 1) is measured as being 44 dB-Hz and the received signal C2 (i.e., carrier-to-noise density power ratio $C/N_0$ for satellite 2) is measured as being 22 dB-Hz in the absence of interference. Initially, a strong correlator (e.g., a correlator such as first correlator 68 of FIG. 11 that has a relatively short integration time) may be used in producing the 22 dB-Hz measurement when searching for satellite 2. By comparing the 44 dB-Hz and 22 dB-Hz measurements, it can be determined whether the strong signal (i.e., the 44 dB-Hz signal) is sufficiently strong relative to the weak signal (i.e., the 22 dB-Hz signal) to warrant validation of the weak signal using a correlator with a longer integration time (i.e., a correlator such as the second correlator of FIG. 11).

With one illustrative arrangement, the 44 dB-Hz and 22 dB-Hz values may be compared by computing the difference between these two signals and comparing the difference to a predetermined threshold of 20 dB-Hz. In particular, the test of equation 2 may be used to compare the C1 and C2 values.

$$44\text{ dB-Hz} - 22\text{ dB-Hz} > 20\text{ dB-Hz} \qquad (2).$$

If the test of equation 2 is satisfied, device 10 can conclude that the C1 signal is sufficiently larger than the C2 signal to raise the possibility that the C2 signal is a cross-correlation due to the presence of signal C1. Accordingly, if the test of equation 2 is satisfied, the C2 signal can be rejected.

In this example, 44 dB-Hz−22 dB-Hz is equal to 22 dB-Hz. Because 22 dB-Hz is larger than 20 dB-Hz, it is possible that the C2 signal is a cross-correlation, so the C2 signal can be rejected.

In the presence of interference, the use of equation 2 as a test to determine whether a signal is a cross-correlation can be compromised. Consider, as an example, a scenario in which 3 dB-Hz of noise is present. For a given signal strength, the value C1 (i.e., carrier-to-noise density power ratio $C/N_0$) will decrease in the presence of increased noise. For example, the 44 dB-Hz value of signal C1 will become a 41 dB-Hz value in the presence of 3 dB-Hz noise. Using the threshold test of equation 2, device 10 would determine (in this illustrative scenario) that 41 dB-Hz−22 dB-Hz is 19 dB-Hz, which is less than 20 dB-Hz. Because 19 dB-Hz is less than 20 dB-Hz, it would appear to device 10 as if the C2 signal is not a cross-correlation.

As this example demonstrates, a conventional cross-correlation protection scheme that does not change its validation strategy due to the presence or absence of noise can be compromised in the presence of interference. To avoid this possibility, device 10 preferably adjusts its cross-correlation protection strategy whenever interference is detected. As an example, device 10 may dynamically adjust the validation threshold for weak signal detections (e.g., the 20 dB-Hz threshold in the example above), thereby ensuring that strong signals that have been reduced in strength due to the presence of interference (e.g., the 41 dB-Hz C1 signal in the example above) will still be strong enough to satisfy the test of equation 2 so that cross-correlation signals (e.g., the C2 signal in the example above) can be properly rejected. If desired, device 10 may also increase the integration interval used when performing the comparison of equation 2 to increase sensitivity (e.g., the strong signal integration interval can be increased).

Figure 12:
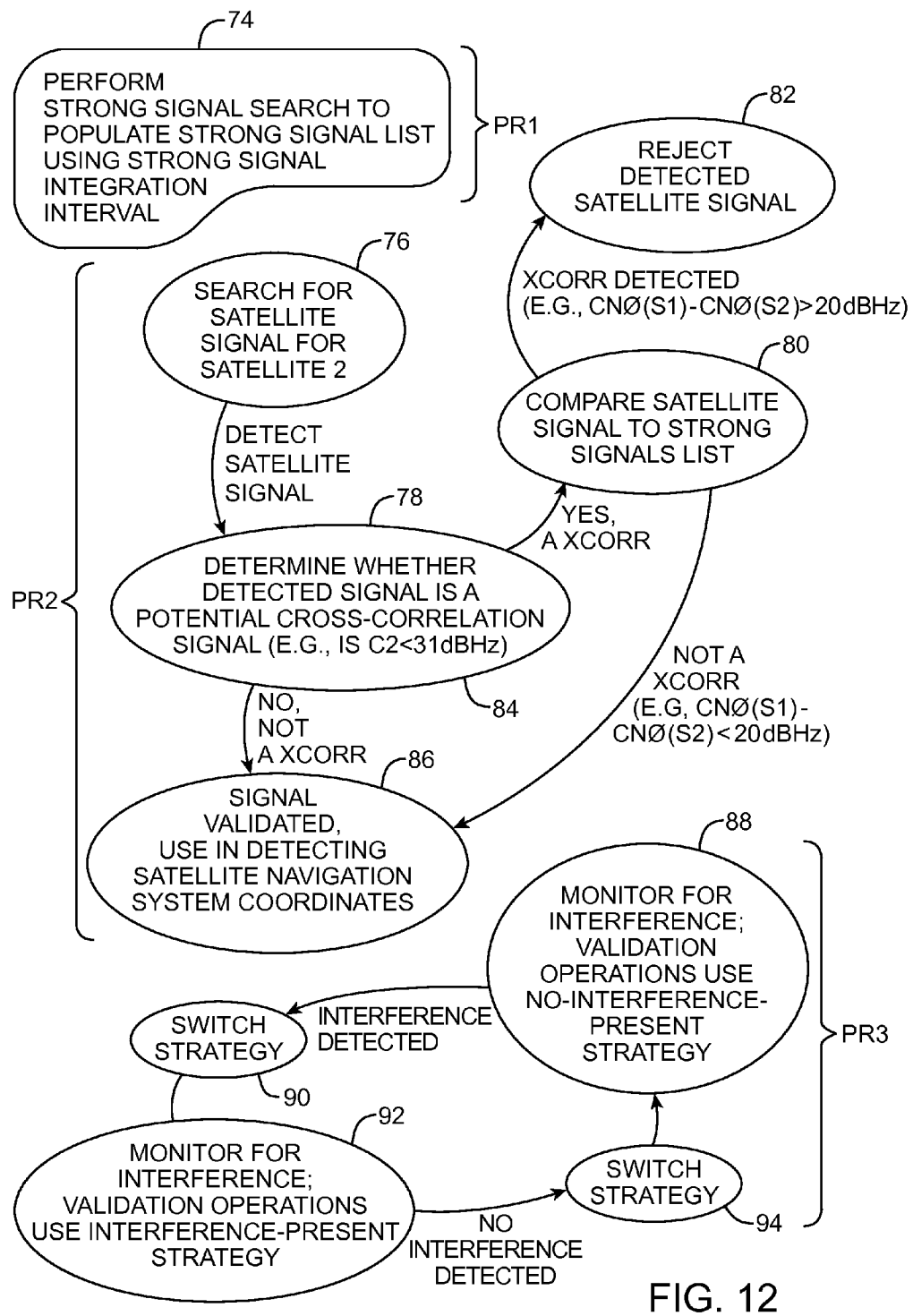
FIG. 12 is a diagram of an illustrative operations involved in operating an electronic device with sensitive circuitry such as satellite navigation system circuitry in an environment that may exhibit interference in accordance with an embodiment of the present invention.

Illustrative steps involved in operating device 10 while dynamically adjusting the cross-correlation protection strategy used by device 10 in response to the presence of radio-frequency interference are shown in FIG. 12.

Three parallel processes are shown in FIG. 12: process PR1, process PR2, and process PR3. These processes may be performed concurrently by the control circuitry in device 10.

The operation of process PR1 (step 74) may involve performing a search for strong signals (e.g., using a first correlator 68 having an integration interval TI). The strong signals that are detected (e.g., signals such as the C1 signal in the preceding example) may be added to a strong signal list.

In parallel with the operations of process PR1, device 10 may use its control circuitry to perform the operations of process PR2. The operations of process PR2 may be used to detect valid weak signals. In the example of FIG. 12, device 10 is using the operations of process PR2 to evaluate signals associated with satellite 2, but, in practice, process PR2 is used to evaluate signals from all other satellites as well as satellite 2.

At step 76, device 10 may search for a satellite signal associated with satellite 2 (i.e., device 10 may use a strong signal correlator 68 to measure satellite signal C2).

At step 78, device 10 may determine whether satellite signal C2 is weak enough to be a potential cross-correlation signal. For example, device 10 may compare the value of C2 to a strong signal threshold value (e.g., 31 dB-Hz). If the magnitude of C2 is greater than the threshold amount, the C2 signal is too strong to be a cross-correlation and the C2 signal is therefore validated. The validated C2 signal can then be used by device 10 as satellite navigation system data in determining the geographic coordinates of device 10 (step 86). In response to determining, at step 78, that the magnitude of C2 is less than the strong threshold amount, the value of C2 can be compared to the values of the strong signals in the strong signal list (step 80).

As an example, there may be a strong signal C1 in the strong signal list. During the operations of step 80, device 10 can perform the comparison of equation 2 (and may, if desired, apply other suitable criteria). If the test of equation 2 is not satisfied (i.e., if C1-C2 is less than 20 dB-Hz), the C2 signal is not a cross-correlation. Device 10 may therefore validate the C2 signal and may use signal C2 as satellite navigation system data in determining the geographic coordinates of device 10 (step 86). If, however, the test of equation 2 is satisfied (i.e., if C1-C2 is greater than 20 dB-Hz), device 10 can conclude that signal C2 is a cross-correlation. The C2 signal can then be rejected by device 10 at step 82.

Under some operating conditions, interference will be present for the satellite navigation receiver. The interference may result from the simultaneous operation of transmitters TX1 and TX2 using a combination of channels that creates noise with a frequency that falls within the satellite navigation system receiver operating band. To ensure that the presence of interference does not compromise the cross-correlation protection strategy implemented using processes PR1 and PR2, process PR3 may be used to dynamically update the cross-correlation protection strategy used by device 10 for processes PR1 and PR2. By dynamically adjusting the cross-correlation protection strategy, an appropriate strategy can be selected depending on whether or not interference is present.

As shown in FIG. 12, when no interference is present, process PR3 may involve using control circuitry in device 10 to monitor for the presence of interference while performing the validation operations of process PR2 using a cross-correlation protection strategy that is appropriate for situations in which no interference is present (step 88). If interference is detected, device 10 may, at step 90, switch to use of a cross-correlation protection strategy that is appropriate for situation in which interference is present.

Any suitable interference-present cross-correlation protection strategy may be used. As an example, cross-correlation protection thresholds and/or other criteria can be switched from no-interference-present settings to interference-present settings.

Consider, as an example, the situation in which 3 dB-Hz of interference is present. When a condition that produces interference is detected, the 20 dB-Hz threshold that is used in performing the comparison operations of step 80 may be decreased. The 20 dB-Hz threshold may, for example, be decreased by 3 dB-Hz to a value of 17 dB-Hz. By using a 17 dB-Hz threshold instead of a 20 dB threshold, the comparison of step 80 using equation 2 will accurately discriminate between cross-correlation events and valid signals, despite the presence of the 3 dB-Hz of interference.

In addition to adjusting the validation threshold of step 80, the cross-correlation protection strategy switching operations of step 90 may also involve changes to the integration time used by the correlator of process PR1 (e.g., to increase the sensitivity of this correlator to recover the sensitivity that is lost due to the presence of interference). If, as an example, the correlator used during process PR1 initially was configured to detect strong signals in a range of 51 to 31 dB-Hz, but would only be able to detect signals in a range of 51 to 34 dB-Hz in the presence of 3 dB-Hz of interference, the operations of step 90 may be used to increase the integration time T1 of the correlator to increase the sensitivity of the correlator to allow signal detection in the range of 51 to 31 dB-Hz.

After adjusting the validation threshold for weak signals and/or increasing the integration time T1 for the correlator used in maintaining the strong signal list, device 10 may, at step 92, monitor for interference while performing the validation operations of process PR2 using the interference-present settings.

In response to detecting that interference is no longer present, device 10 may, at step 94 switch the cross-correlation protection strategy that is being used back to its original no-interference-present settings. These no-interference-present settings may then be used during the signal validation operations of step 88.

If desired, device 10 may intelligently select between different possible schemes for mitigating the effects of interference in real time. As an example, device 10 can dynamically switch between a first mode of operation in which a receiver blanking scheme of the type shown in FIG. 4 is used to mitigate the effects of interference and a second mode of operation in which more complex software-implemented processes such as processes PR1, PR2, and PR3 of FIG. 12 are used.

Device 10 may choose to operate in the first radio-frequency interference mitigation mode or the second radio-frequency interference mitigation mode based on the type of interference that is being experienced. If, for example, intermittent interference is present (e.g., interference that lasts no more than a predetermined amount of time), receiver blanking operations may be satisfactory in overcoming the adverse effects of interference. When persistent interference (e.g., interference that lasts longer than the predetermined amount of time due to the need for device 10 to upload a large file over a wireless local area network connection while maintaining a cellular telephone link or to otherwise performing a wireless function that requires extensive use of transmitters TX1 and TX2), device 10 may use an interference-sensitive cross-correlation detection scheme of the type shown in FIG. 12.

Figure 13:
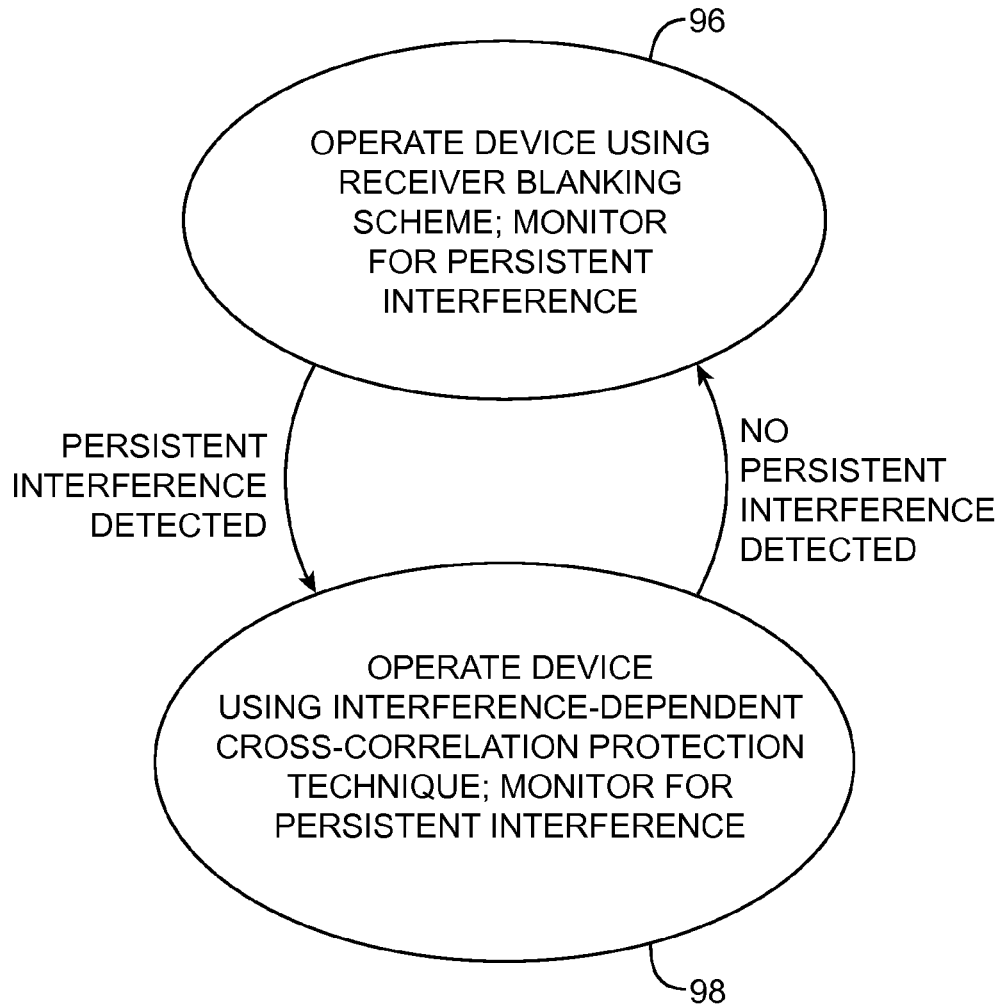
FIG. 13 is a diagram of illustrative steps involved in operating an electronic device in an environment that may exhibit persistent interference in accordance with an embodiment of the present invention.

Illustrative steps involved in using device 10 to dynamically switch between operating modes in this way depending on the type of interference that is present are shown in FIG. 13.

At step 96, the control circuitry in device 10 may be used to monitor for persistent receiver interference while using receiver blanking to mitigate the effects of any interference that is present. For example, whenever transmitters TX1 and TX2 are operated simultaneously, receiver RX can be momentarily deactivated as shown in FIG. 3.

Upon detection of persistent interference (i.e., interference that is present for a long enough period of time to prevent the satisfactory use of the receiver blanking mode of step 96), the control circuitry in device 10 may switch to an alternative operating mode (step 98). In the operating mode of step 98, device 10 may, as an example, use an interference-dependent cross-correlation protection strategy such as the signal validation technique of FIG. 12. When the persistent interference is no longer present, operations may return to step 96.

The foregoing is merely illustrative of the principles of this invention and various modifications can be made by those skilled in the art without departing from the scope and spirit of the invention.

What is claimed is:

1. A method for mitigating the impact of radio-frequency interference on sensitive circuitry in an electronic device, wherein the radio-frequency interference interferes with the sensitive circuitry and is produced by a noise source in the electronic device, the method comprising:
    with control circuitry in the electronic device, determining whether the radio-frequency interference is present; and
    in response to detection of the radio-frequency interference by the control circuitry, imposing duty cycle limitations on the noise source.

2. The method defined in claim 1 wherein the noise source includes at least a first radio-frequency transmitter and a second radio-frequency transmitter, wherein the radio-frequency interference is produced due to simultaneous operation of the first and second radio-frequency transmitters, and wherein imposing the duty cycle limitations on the noise source comprises imposing a duty cycle requirement on the second radio-frequency transmitter.

3. The method defined in claim 2 wherein the sensitive circuitry comprises satellite navigation system receiver circuitry and wherein imposing the duty cycle requirement on the second radio-frequency transmitter comprises cycling the second radio-frequency transmitter on and off while operating the satellite navigation system receiver circuitry.

4. The method defined in claim 3 wherein the first radio-frequency transmitter comprises a cellular telephone transmitter, wherein the second radio-frequency transmitter comprises a wireless local area network transmitter, and wherein imposing the duty cycle requirements comprises cycling the wireless local area network transmitter on and off while the cellular telephone transmitter is operating.

5. The method defined in claim 2 wherein the sensitive circuitry comprises satellite navigation system receiver circuitry and wherein imposing the duty cycle requirement on the second radio-frequency transmitter comprises cycling the second radio-frequency transmitter on and off while selectively blanking the satellite navigation system receiver circuitry in synchronization by temporarily deactivating the satellite navigation system receiver circuitry whenever the second radio-frequency transmitter is cycled off.

6. The method defined in claim 5 wherein the first radio-frequency transmitter comprises a cellular telephone transmitter, wherein the second radio-frequency transmitter comprises a wireless local area network transmitter, and wherein imposing the duty cycle requirement comprises cycling the wireless local area network transmitter on and off while the cellular telephone transmitter is operating.

7. A method for mitigating the impact of radio-frequency interference on satellite navigation system receiver circuitry in an electronic device, wherein the radio-frequency interference is produced by a noise source in the electronic device and wherein the satellite navigation system receiver circuitry comprises a first satellite navigation system receiver and a second satellite navigation system receiver, the method comprising:
    receiving location data from the first satellite navigation system receiver with control circuitry in the electronic device while using the control circuitry to determine whether radio-frequency interference from the noise source that interferes with operation of the first satellite navigation system receiver is present; and
    in response to determining that the radio-frequency interference that interferes with the operation of the first satellite navigation system receiver is present, using the control circuitry to switch the second satellite navigation system receiver into use in place of the first satellite navigation system receiver so that the control circuitry receives location data from the second satellite navigation system receiver.

8. The method defined in claim 7 wherein the noise source includes at least a first radio-frequency transmitter and a second radio-frequency transmitter and wherein the radio-frequency interference is produced from simultaneous operation of the first and second radio-frequency transmitters, the method further comprising:
    using the control circuitry to determine whether radio-frequency interference from the noise source that interferes with operation of the second satellite navigation system receiver is present.

9. The method defined in claim 8 wherein the first satellite navigation system receiver comprises a Global Positioning System receiver and wherein the second satellite navigation system receiver comprises a Global Navigation Satellite System receiver, the method further comprising:
    in response to determining that the radio-frequency interference that interferes with the operation of the Global Navigation Satellite System receiver is present, using the control circuitry to switch the Global Positioning System receiver into use in place of the Global Navigation Satellite System receiver so that the control circuitry receives location data from the Global Positioning System receiver.

10. A method for mitigating the impact of radio-frequency interference on satellite navigation system receiver circuitry in an electronic device, wherein the radio-frequency interference for the satellite navigation system receiver circuitry is produced by a noise source in the electronic device, the method comprising:
    with control circuitry in the electronic device, measuring a satellite signal received from a first satellite to produce a first satellite signal value;
    with the control circuitry, measuring an additional satellite signal associated with a second satellite to produce a second satellite signal value;
    with the control circuitry, applying a cross-correlation validation test to the second satellite signal value and the first satellite signal value to determine whether the second satellite signal is valid;
    with the control circuitry, determining whether the radio-frequency interference for the satellite navigation system receiver circuitry is present; and
    in response to determining that the radio-frequency interference is present, changing the cross-correlation validation test.

11. The method defined in claim 10 wherein the noise source comprises a first radio-frequency transmitter and a second radio-frequency transmitter, wherein the radio-frequency interference is produced due to simultaneous operation of the first and second radio-frequency transmitters, and wherein changing the cross-correlation validation test comprises switching a no-interference-present threshold value for the cross-correlation validation test to an interference-present threshold value for the cross-correlation validation test.

12. The method defined in claim 11 wherein the electronic device comprises at least one correlator implemented on the control circuitry that processes received satellite signals using an integration interval, the method further comprising:

increasing the integration interval in response to determining that the radio-frequency interference is present.

13. The method defined in claim 12 wherein the first radio-frequency transmitter comprises a cellular telephone transmitter, wherein the second radio-frequency transmitter comprises a wireless local area network transmitter, and wherein the radio-frequency interference is produced due to simultaneous operation of the cellular telephone transmitter and the wireless local area network transmitter.

14. The method defined in claim 11 wherein the first radio-frequency transmitter comprises a cellular telephone transmitter, wherein the second radio-frequency transmitter comprises a wireless local area network transmitter, and wherein the radio-frequency interference is produced due to simultaneous operation of the cellular telephone transmitter and the wireless local area network transmitter.

15. The method defined in claim 11 wherein the first radio-frequency transmitter comprises a cellular telephone transmitter, wherein the second radio-frequency transmitter comprises a wireless local area network transmitter, and wherein switching the no-interference-present threshold value for the cross-correlation validation test to the interference-present threshold value for the cross-correlation validation test comprises reducing the non-interference-present threshold value to a lower value.

16. A method for mitigating the impact of radio-frequency interference on sensitive circuitry in an electronic device, wherein the radio-frequency interference interferes with the sensitive circuitry and is produced by a noise source in the electronic device, the method comprising:

with control circuitry in the electronic device, determining whether persistent radio-frequency interference is present; and in response to determining that persistent radio-frequency interference is not present, operating the electronic device in a first radio-frequency interference mitigation mode using the control circuitry; and in response to determining that persistent radio-frequency interference is present, operating the electronic device in a second radio-frequency interference mitigation mode using the control circuitry, wherein the sensitive circuitry comprises radio-frequency receiver circuitry, wherein the noise source includes at least a first radio-frequency transmitter and a second radio-frequency transmitter, and wherein operating the electronic device in the first radio-frequency interference mitigation mode comprises operating the electronic device in a receiver blanking mode in which the radio-frequency receiver circuitry is temporarily deactivated.

17. The method defined in claim 16 wherein the radio-frequency receiver circuitry comprises satellite navigation system receiver circuitry and wherein operating the electronic device in the second radio-frequency interference mitigation mode comprises performing interference-dependent cross-correlation protection operations using the control circuitry.

18. The method defined in claim 17 wherein performing the interference-dependent cross-correlation protection operations comprises:

with the control circuitry, measuring a satellite signal received from a first satellite to produce a first satellite signal value;

with the control circuitry, measuring an additional satellite signal associated with a second satellite to produce a second satellite signal value; and with the control circuitry, applying a cross-correlation validation test to the second satellite signal value and the first satellite signal value to determine whether the second satellite signal is valid.

19. The method defined in claim 18 wherein performing the interference-dependent cross-correlation protection operations further comprises:

with the control circuitry, determining whether the radio-frequency interference for the satellite navigation system receiver circuitry is present; and in response to determining that the radio-frequency interference is present, adjusting a threshold value for the cross-correlation validation test.

* * * * *